March 8, 1938. W. HORVATH 2,110,269
BALL CASTER
Filed Oct. 24, 1936

INVENTOR
William Horvath
BY
ATTORNEY

Patented Mar. 8, 1938

2,110,269

UNITED STATES PATENT OFFICE 2,110,269

BALL CASTER

William Horvath, New Brunswick, N. J.

Application October 24, 1936, Serial No. 107,444

3 Claims. (Cl. 16—24)

This invention relates to new and useful improvements in a ball caster for furniture adapted to be used in the place of conventional casters.

The invention has for an object the construction of a ball caster which is characterized by a stud element for attachment on the furniture, a ball bearing socket associated with said stud element and supporting a steel ball, and a cap element for engaging over said socket and holding said ball therein with a portion projecting from the cap element to engage against the ground or other surface.

Still further the invention proposes to adapt the ball caster for the legs of furniture and for the bottom supporting elements of furniture or the like.

Still further the invention contemplates constructing the socket element integral with the stud element.

Another one of the objects of this invention resides in so arranging the parts that the cap element may be screwed upon the socket element or may be attached by lugs or other fastening elements.

Still further the invention proposes the provision of an adjustable wire mounted on the cap element and adapted to control an opening therein through which the ball may project so as to adapt the device for steel balls having various tolerances in relation to the cap elements.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

The ball caster for furniture comprises a stud element 10 for attachment on or to furniture and associated with a ball bearing socket 11 housing a steel ball 12. A cap 13 is engaged upon the socket 11 and is formed with an opening 13$^a$ encircling the steel ball 12 outside of a large circle thereof to hold the steel ball within the socket.

The stud element 10 is formed with threads 10$^a$ for threadedly engaging into the legs of furniture or other parts. The socket 11 is integral with the stud element 10. It is also formed with external threads 11'. The cap 13 is threadedly engaged on the threads 11'. The socket 11 is formed with a socket opening 11$^a$ into which the ball 12 is disposed, so that the ball will touch the inner face of the socket opening, only at one point.

Figure 3:
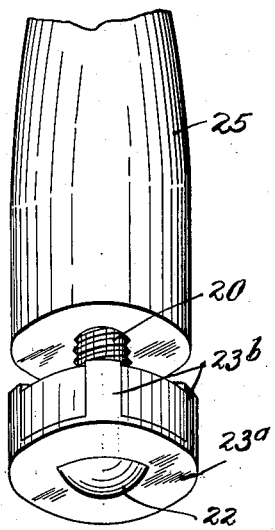
Fig. 3 is a perspective view of a ball caster embodying a modification of the invention.
Figure 4:
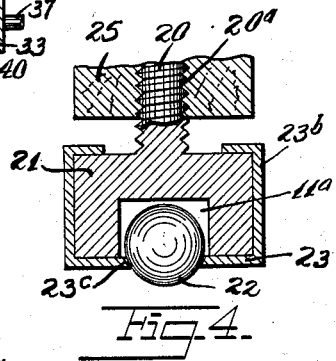
Fig. 4 is a fragmentary vertical sectional view of a portion of Fig. 3.

In Figs. 3 and 4 another embodiment of the invention has been disclosed in which the ball caster comprises a stud element 20 for attachment on furniture or the like and associated with a socket 21 for a ball 22. This ball is held in position with a cap element 23. The stud element 20 is formed with threads 20$^a$ which threadedly engage into the leg 25 or other element of furniture. The socket 21 is formed with a socket recess 11$^a$ in which the steel ball 22 is disposed.

The cap 23 comprises a disc portion 23$^a$ engaged across the bottom side of the socket 21, and from the periphery of which there projects a plurality of holding fingers 23$^b$. These fingers are bent over a portion of the socket element to maintain the position of the cap. The disc portion 23$^a$ is formed with an opening 23$^c$ through which the steel ball 22 projects. This opening is smaller than a great circle of the steel ball to maintain the steel ball from falling out.

Figure 5:
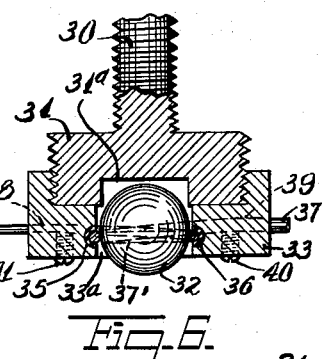
Fig. 5 is a bottom elevational view of another ball caster embodying another modification of the invention.
Figure 6:
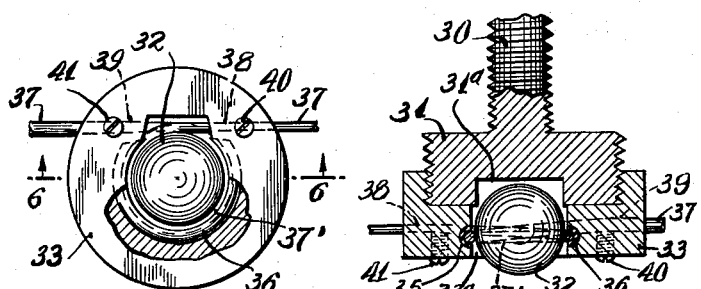
Fig. 6 is a sectional view taken on the line 6—6 of Fig. 5.

In Figs. 6 and 5 another embodiment of the invention has been disclosed in which an arrangement is provided for adapting the ball caster to hold steel balls of slightly different sizes or holding a certain steel ball with different tolerances. According to this form of the invention there is a stud element 30 to which a socket element 31 is associated. A steel ball 32 is mounted within the socket element and projects therefrom through a holding cap 33. The holding cap is formed with a central opening 33$^a$ through which the ball 32 projects.

This central opening has a groove 35 upon its wall into which a resilient element 36 is engaged. This resilient element extends through substantially 300° so that there is an opening through which a holding wire 37, as hereinafter described, may pass. This holding wire is indicated generally by reference numeral 37. It extends through passages 38 and 39 formed in the material of the cap element 33. This wire 37 is of varying thickness and may be pulled in one direction or the other to engage different portions thereof against the resilient element 36. The resilient element 36 is formed with a groove in its outer face into which the wire 37 engages. Set screws 40 and 41 engage against the end portions of the wire 37 to hold the wire in fixed positions. These set screws are threadedly mounted through the material of the cap element 33.

The wire element 37 is formed into a looped portion 37' which engages about the ball 32 at an area below a great circle thereof to hold the ball from falling out of the socket element 31. The socket element is formed with a recessed portion 31ª into which the ball 32 engages. The screws 40 and 41 may be momentarily loosened and the wire 37 moved so that either a thicker or thinner portion thereof is disposed within the looped portion 37' and so the size of the holding portion varies. The resilient element 36 is adapted to compensate for any eccentricity of the loop portion 37' so that it is substantially concentric and capable of supporting the steel ball.

Figure 1:
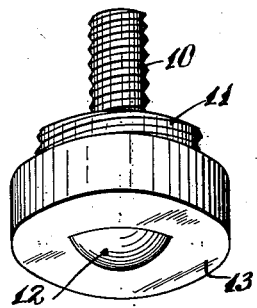
Fig. 1 is a perspective view of a ball caster constructed according to this invention.
Figure 2:
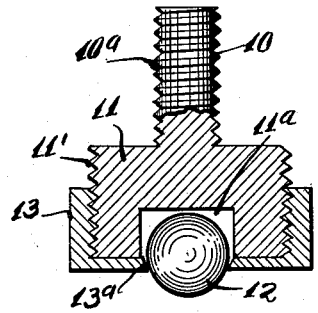
Fig. 2 is a vertical sectional view of Fig. 1.

The form of the invention illustrated in Figs. 5 and 6 may be applied to the cap elements shown in Figs. 2 and 4. Also, this arrangement may be incorporated in the form of the invention shown in Figs. 7 and 8.

Figure 7:
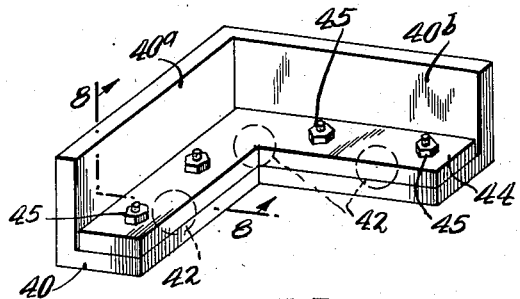
Fig. 7 is a perspective view of a support foot for furniture provided with a ball caster construction, according to this invention.
Figure 8:
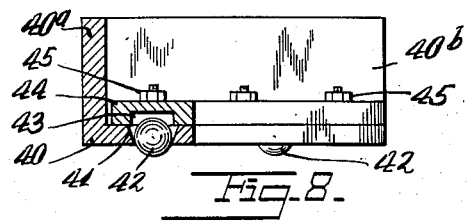
Fig. 8 is a sectional view taken on the line 8—8 of Fig. 7.

In Figs. 7 and 8 another embodiment of the invention has been disclosed in which there is a corner piece consisting of an angle shaped element 40 having arms 40ª and 40ᵇ at right angles to each other. The lower arm of the angle shape is formed with socket openings 41 through which steel balls 42 project. These steel balls extend upwards within recesses 43 formed in a holding element 44 attached by several bolts 45 to the material of the member 40. These balls project from the bottom face of the angle member 40 and rest upon the ground. The corner element may be used to support the corner of a piece of furniture or other element. Preferably, four of these corner devices are needed to support a rectangular piece of furniture.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A ball caster for furniture and the like, comprising a stud element for attachment to furniture, a ball bearing socket associated therewith, a steel ball engaging in said socket, and a cap engaging on said socket for holding said ball therein, said cap being formed with an aperture into which the steel ball projects, a groove in the adjacent face of said aperture, a resilient element mounted within said groove, and a flexible wire looped to seat in said resilient element and having its ends extending outwards and secured upon said cap.

2. A ball caster for furniture and the like, comprising a stud element for attachment to furniture, a ball bearing socket associated therewith, a steel ball engaging in said socket, and a cap engaging on said socket for holding said ball therein, said cap being formed with an aperture into which the steel ball projects, a groove in the adjacent face of said aperature, a resilient element mounted within said groove, and a flexible wire looped to seat in said resilient element and having its ends extending outwards and secured upon said cap, said flexible wire being of different thickness from end to end so that as it is fixed longitudinally, the operative size of said loop portion will vary.

3. A ball caster for furniture and the like, comprising a stud element for attachment to furniture, a ball bearing socket associated therewith, a steel ball engaging in said socket, and a cap engaging on said socket for holding said ball therein, said cap being formed with an aperture into which the steel ball projects, a groove in the adjacent face of said aperture, a resilient element mounted within said groove, and a flexible wire looped to seat in said resilient element and having its ends extending outwards and secured upon said cap, the ends of said wire being held with said screws mounted through the material of said cap.

WILLIAM HORVATH.